United States Patent
Mears et al.

(10) Patent No.: US 7,499,107 B2
(45) Date of Patent: Mar. 3, 2009

(54) METHOD AND APPARATUS FOR CONTROLLING AN EXTERNAL DEVICE BY REMAPPING KEYS ON A USER INPUT DEVICE

(75) Inventors: Mark Gilmore Mears, Zionsville, IN (US); Chad Andrew Lefevre, Indianapolis, IN (US); Aaron Hal Dinwiddie, Cicero, IN (US); Eric Stephen Carlsgaard, Zionsville, IN (US); Joseph Wayne Forler, Zionsville, IN (US)

(73) Assignee: Thomson Licensing, Boulogne Billancourt (FR)

( * ) Notice: Subject to any disclaimer, the term of this patent is extended or adjusted under 35 U.S.C. 154(b) by 548 days.

(21) Appl. No.: 10/554,327

(22) PCT Filed: May 4, 2004

(86) PCT No.: PCT/US2004/013861

§ 371 (c)(1),
(2), (4) Date: Oct. 24, 2005

(87) PCT Pub. No.: WO2004/100003

PCT Pub. Date: Nov. 8, 2004

(65) Prior Publication Data

US 2006/0221234 A1    Oct. 5, 2006

Related U.S. Application Data

(60) Provisional application No. 60/467,932, filed on May 5, 2003.

(51) Int. Cl.
*H04N 5/22* (2006.01)
*G09G 5/00* (2006.01)
*G06F 13/00* (2006.01)

(52) U.S. Cl. .................. 348/552; 340/825.69; 710/104

(58) Field of Classification Search .............. 348/552, 348/553, 734, 725; 340/825.69, 825.72; 710/104
See application file for complete search history.

(56) References Cited

U.S. PATENT DOCUMENTS 4,337,480 A * 6/1982 Bourassin et al. ........... 348/552

(Continued)

FOREIGN PATENT DOCUMENTS

EP    1113442 A2    7/2001

OTHER PUBLICATIONS

Search Report Dated Aug. 29, 2005.

*Primary Examiner*—Paulos M Natnael
(74) *Attorney, Agent, or Firm*—Robert D. Shedd; Joseph J. Opalach; Reitseng Lin (57) ABSTRACT

An apparatus such as a television signal receiver controls an external device such as a digital recording/reproduction device via a digital data bus by remapping keys on a user input device. According to an exemplary embodiment, the apparatus includes an input/output terminal operative to enable signal transfer between the television signal receiver and an external device via a digital data bus. A processor is operative to detect a first command signal of a first control protocol from a user input device, and to detect one of first and second modes of the television signal receiver. The processor detects the first mode in response to making a connection between the television signal receiver and the external device via the digital data bus, and detects the second mode in response to terminating the connection between the television signal receiver and the external device via the digital data bus. The processor enables the input/output terminal to output a second command signal of a second control protocol to the external device via the digital data bus responsive to the first command signal if the first mode is detected. The processor enables a function of the television signal receiver responsive to the first command signal without enabling output of the second command signal to the external device if the second mode is detected.

31 Claims, 3 Drawing Sheets

U.S. PATENT DOCUMENTS

| | | | |
|---|---|---|---|
| 4,817,203 A | 3/1989 | Tsurumoto et al. | 455/603 |
| 5,598,523 A | 1/1997 | Fujita | 395/352 |
| 6,912,596 B2 * | 6/2005 | Skidmore et al. | 710/1 |
| 7,084,780 B2 * | 8/2006 | Nguyen et al. | 340/825.69 |
| 7,305,503 B2 * | 12/2007 | Lefevre et al. | 710/104 |

* cited by examiner

METHOD AND APPARATUS FOR CONTROLLING AN EXTERNAL DEVICE BY REMAPPING KEYS ON A USER INPUT DEVICE

CROSS REFERENCE TO RELATED APPLICATION

This application claims the benefit, under 35 U.S.C. § 365 of International Application PCT/US2004/013861, filed May 4, 2004, which was published in accordance with PCT Article 21(2) on Nov. 18, 2004 in English and which claims the benefit of United States Provisional Patent Application No. 60/467,932, filed May 5, 2003.

BACKGROUND OF THE INVENTION

1. Field of the Invention

The present invention generally relates to a technique for controlling an external device, and more particularly, to a method and apparatus for controlling an external device such as a digital recording/reproduction device via a digital data bus by remapping keys on a user input device.

2. Background Information

A digital data bus can be utilized for transmitting digital data in a network among digital devices, such as television signal receivers, personal computers (PCs), display devices, video cassette recorders (VCRs), digital versatile disc (DVD) players, direct broadcast satellite (DBS) receivers, home control devices (e.g., security systems, temperature control devices, etc.), and/or other devices. A digital data bus is typically compliant with a particular standard or specification. An example of a wired digital bus standard includes the Institute for Electrical and Electronic Engineers (IEEE) 1394 High Performance Serial Bus standard, which is well known in the art. Wireless digital bus standards, such as Hiperlan2, are also known in the art.

Certain bus devices may not include their own remote control device or on-screen display (OSD). As a result, such devices may be difficult for users to control. For example, certain digital recording/reproduction devices such as audio/video hard disk drives (AVHDDs), and digital video cassette recorder (DVCRs), which are compliant with IEEE-1394 may not include their own remote control device or OSD, and may therefore be difficult for users to control.

One approach for enabling user control of a bus device not having its own remote control device or OSD is to use another bus device, which does include a remote control device and OSD. For example, certain television signal receivers compliant with IEEE-1394 may include a remote control device having a predetermined key (e.g., DISPLAY key) which, when depressed, produces an OSD including a list of commands for an external device such as a digital recording/reproduction device connected to the television signal receiver via an IEEE-1394 bus. The user may then use the remote control device to navigate through the on-screen list of commands and select a desired command (e.g., play, record, stop, etc.) for controlling the external device. This type of control method, however, tends to be inconvenient and time-consuming for users since it requires them to interact with an OSD and make multiple key inputs before the external device can be controlled.

Accordingly, there is a need for a method and apparatus that avoids the foregoing problems, and thereby enables an external device such as a digital recording/reproduction device on a digital data bus to be controlled in a more direct manner. The present invention addresses these and/or other issues.

SUMMARY OF THE INVENTION

In accordance with an aspect of the present invention, a method for controlling an external device is disclosed. According to an exemplary embodiment, the method comprises steps of setting one of first and second modes wherein the first mode is set in response to making a connection to the external device via a data bus and the second mode is set in response to terminating the connection to the external device via the data bus, receiving a first command signal of a first control protocol from a user input device, generating a second command signal of a second control protocol responsive to the first command signal and outputting the second command signal to the external device via the data bus if the first mode is set, and performing a function responsive to the first command signal without generating and outputting the second command signal if the second mode is set.

In accordance with another aspect of the present invention, an apparatus is disclosed. According to an exemplary embodiment, the apparatus comprises input/output means for enabling signal transfer between the apparatus and an external device via a data bus. Processing means detect a first command signal of a first control protocol from a user input device, and detect one of first and second modes of the apparatus. The processing means detects the first mode in response to making a connection between the apparatus and the external device via the data bus, and detects the second mode in response to terminating the connection between the apparatus and the external device via the data bus. The processing means enables the input/output means to output a second command signal of a second control protocol to the external device via the data bus responsive to the first command signal if the first mode is detected. The processing means enables a function of the apparatus responsive to the first command signal without enabling output of the second command signal to the external device if the second mode is detected.

In accordance with still another aspect of the present invention, a television signal receiver is disclosed. According to an exemplary embodiment, the television signal receiver comprises an input/output terminal operative to enable signal transfer between the television signal receiver and an external device via a data bus. A processor is operative to detect a first command signal of a first control protocol from a user input device, and to detect one of first and second modes of the television signal receiver. The processor detects the first mode in response to making a connection between the television signal receiver and the external device via the data bus, and detects the second mode in response to terminating the connection between the television signal receiver and the external device via the data bus. The processor enables the input/output terminal to output a second command signal of a second control protocol to the external device via the data bus responsive to the first command signal if the first mode is detected. The processor enables a function of the television signal receiver responsive to the first command signal without enabling output of the second command signal to the external device if the second mode is detected.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Figure 1:
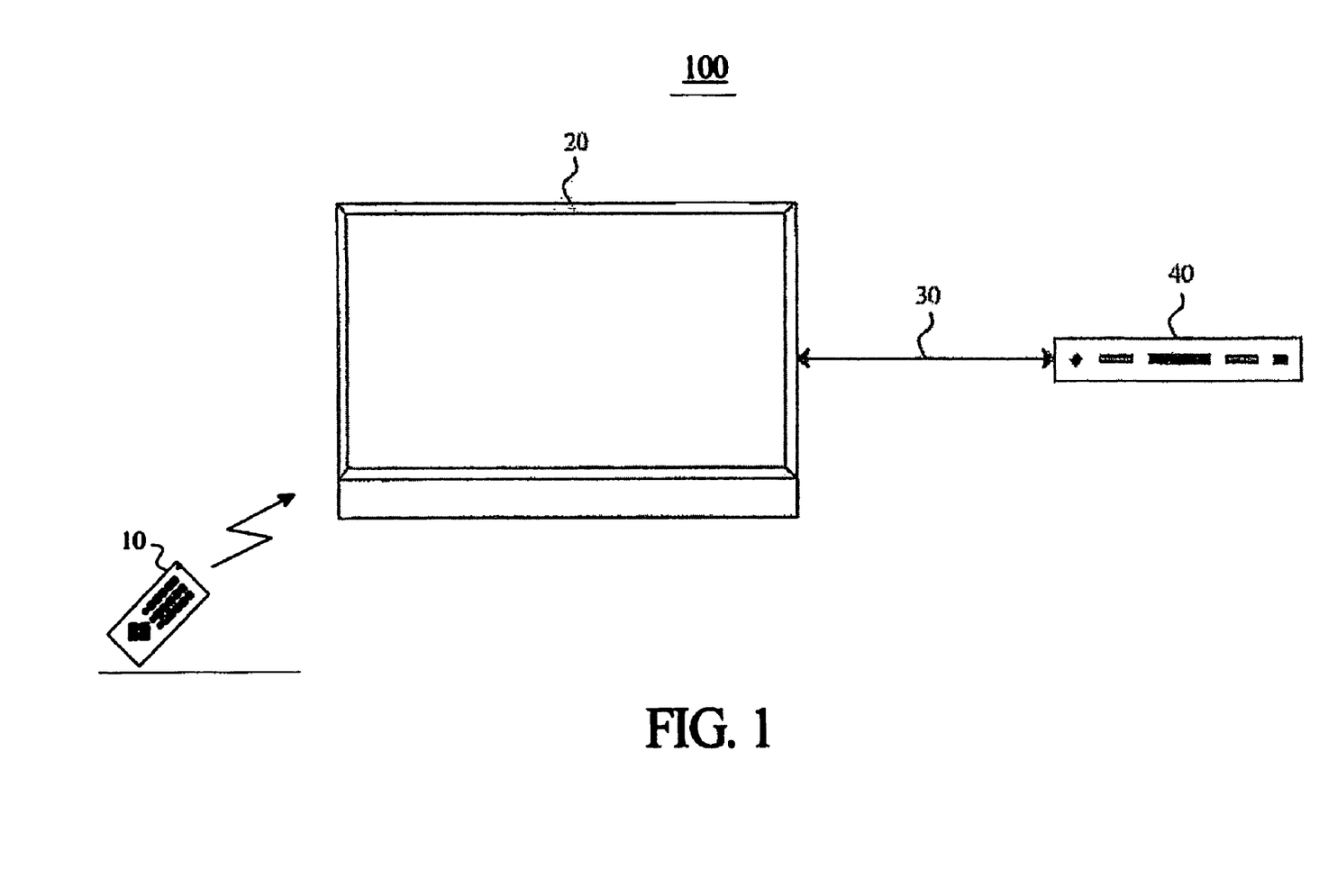
FIG. 1 is an exemplary environment suitable for implementing the present invention.

Referring now to the drawings, and more particularly to FIG. 1, an exemplary environment 100 suitable for implementing the present invention is shown. As indicated in FIG. 1, environment 100 comprises user input means such as user input device 10, controlling means such as apparatus 20, digital bus means such as digital data bus 30, and controlled means such as external device 40.

User input device 10 is operative to receive user inputs that control the operation of apparatus 20 and/or external device 40. According to an exemplary embodiment, user input device 10 comprises a plurality of keys including an up arrow key, a down arrow key, a right arrow key, a down arrow key, a clear key, a guide key, a menu key, an OK key, and/or other keys. Different manufacturers may use different names for the aforementioned keys. For example, the clear key may also be called an exit key, the menu key may also be called a setup key, and the OK key may also be called a select key. User input device 10 transmits command signals in a wired and/or wireless manner in accordance with a predetermined control protocol to apparatus 20 responsive to user depression of its keys. As will be explained later herein, certain keys of user input device 10 such as the aforementioned keys may be used to control the functions of apparatus 20 or external device 40 depending on an operating mode in which apparatus 20 is set. User input device 10 may for example be embodied as a hand-held remote control device, wired and/or wireless keyboard, or other user input device.

Apparatus 20 is operative to receive signals including audio, video and/or data signals in analog and/or digital format from one or more signal sources such as terrestrial, cable, satellite, internet and/or other signal sources. Apparatus 20 is also operative to process received signals to generate digital signals, and to provide such digital signals, as well as digital command signals to one or more devices including external device 40 via digital data bus 30. Apparatus 20 may also receive digital signals from one or more devices including external device 40 via digital data bus 30. According to an exemplary embodiment, apparatus 20 may be controlled by command signals provided via user input device 10, or such command signals may be used to control external device 40 depending upon an operating mode in which apparatus 20 is set.

Apparatus 20 includes a plurality of different operating modes. According to an exemplary embodiment, apparatus 20 is set to a first mode in response to making a connection to external device 40 via digital data bus 30, and the second mode is set in response to terminating the connection to external device 40 via digital data bus 30. Such a connection may involve a physical connection, as well as a specific signal exchange between apparatus 20 and external device 40 (e.g., connect request-connect response, disconnect request-disconnect response, etc.). The connection between apparatus 20 and external device 40 via digital data bus 30 may for example include the asynchronous and isochronous connection prescribed by the IEEE-1394 standard. According to an exemplary embodiment, apparatus 20 may be connected to and disconnected from external device 40 responsive to user inputs via user input device 10 which cause apparatus 20 to switch its active input to and away from external device 40, respectively.

As will be described later herein, when apparatus 20 is set to the first mode, the command signals provided from user input device 10 are used to control external device 40. Alternatively, when apparatus 20 is set to the second mode, the command signals provided from user input device 10 are used to directly control apparatus 20 in a conventional manner. Apparatus 20 may for example be embodied as a television signal receiver, or other apparatus. Further details regarding apparatus 20 will be provided later herein with reference to FIG. 2.

Digital data bus 30 is operative to transmit digital signals between devices including apparatus 20 and external device 40. According to an exemplary embodiment, digital data bus 30 may be embodied as a wired and/or wireless digital bus that is compliant with a given bus standard or specification. For example, digital data bus 30 may be embodied as a wired digital bus such as an IEEE-1394 bus and/or a wireless digital bus, such as a Hiperlan2 bus.

External device 40 is operative to receive digital signals including audio, video, data and/or command signals from apparatus 20, and also to provide digital signals to apparatus 20 via digital data bus 30. According to an exemplary embodiment, external device 40 may be embodied as any device that is compliant with the bus standard (e.g., IEEE-1394, Hiperlan2, etc.) of digital data bus 30. For example, external device 40 may be embodied as a digital recording/reproduction device such as an AVHDD, DVCR, or other device.

Figure 2:
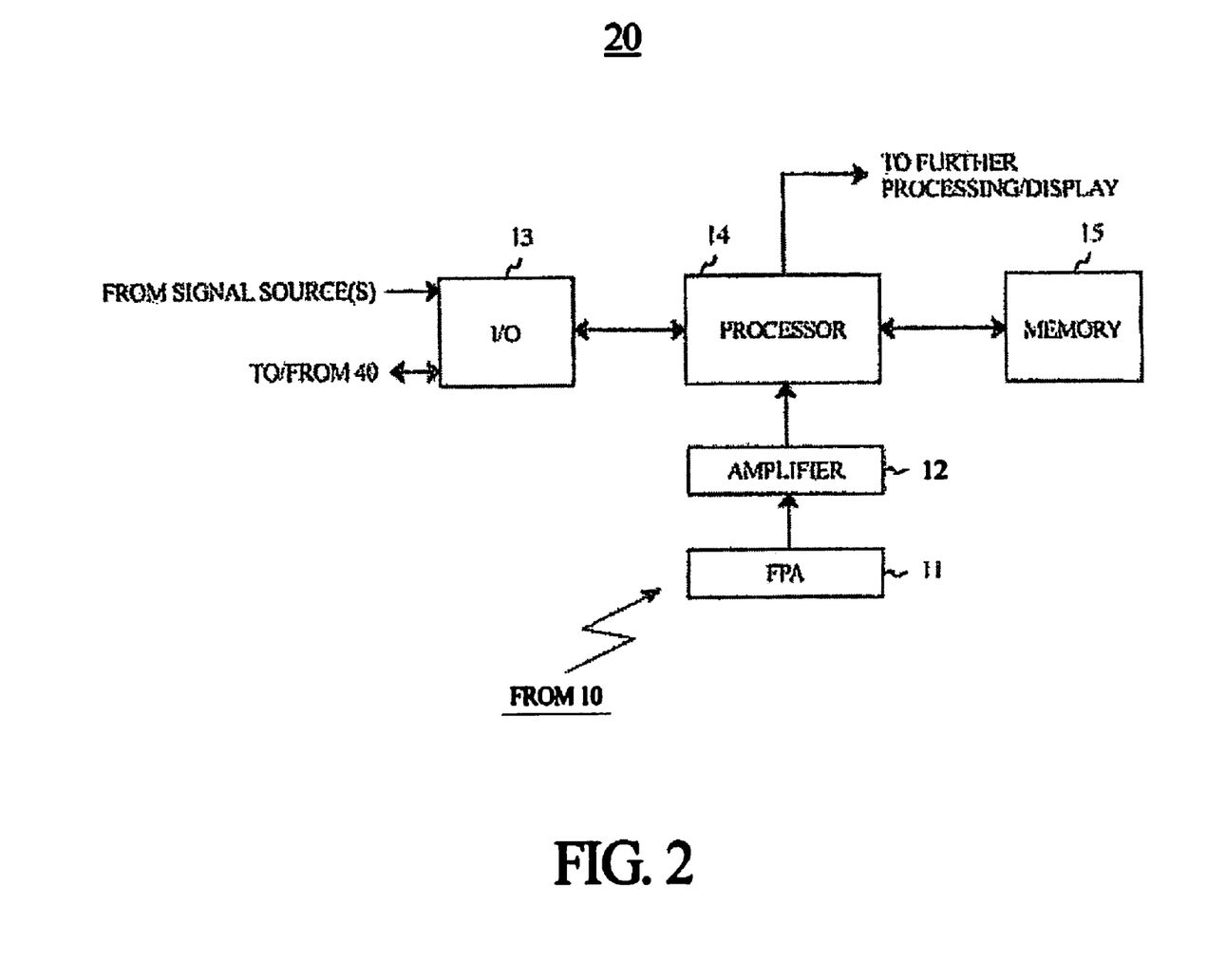
FIG. 2 is a block diagram providing further details of the apparatus of FIG. 1 according to an exemplary embodiment of the present invention.

Referring to FIG. 2, a block diagram providing further details of apparatus 20 of FIG. 1 according to an exemplary embodiment of the present invention is shown. Apparatus 20 of FIG. 2 comprises front panel means such as front panel assembly (FPA) 11, amplifying means such as amplifier 12, and input/output (I/O) means such as I/O block 13, processing means such as processor 14, and memory means such as memory 15. Some of the foregoing elements of FIG. 2 may be embodied using integrated circuits (ICs), and some elements may for example be included on one or more ICs. For clarity of description, certain conventional elements associated with apparatus 20 such as certain control signals, power signals and/or other elements may not be shown in FIG. 2.

FPA 11 is operative to receive user inputs from user input device 10, and to output signals corresponding to the user inputs to amplifier 12. According to an exemplary embodiment, FPA 11 receives wireless signals, such as IR and/or RF signals, from user input device 10 and generates corresponding signals, which are output to amplifier 12. Amplifier 12 is operative to amplify the signals provided from FPA 11 for output to processor 14.

I/O block 13 is operative to perform I/O functions of apparatus 20. According to an exemplary embodiment, I/O block 13 is operative to receive signals including audio, video and/or data signals in analog and/or digital format from one or more signal sources such as terrestrial, cable, satellite, internet and/or other signal sources. I/O block 13 is also operative to output digital signals to and receive digital signals from one or more devices including external device 40 via digital data bus 30. According to an exemplary embodiment, I/O block 13 includes a plurality of input and/or output terminals including at least one bi-directional terminal such as the one connected to digital data bus 30. As referred to herein, an input and/or output terminal of I/O block 13 may be simply referred to as an "input" of apparatus 20. According to an exemplary embodiment, a user input via user input device 10 may cause apparatus 20 to switch from one input to another input via I/O block 13.

Processor 14 is operative to perform various signal processing and control functions of apparatus 20. According to an exemplary embodiment, processor 14 processes signals provided from I/O block 13 by performing functions including tuning, demodulation, forward error correction, and transport processing functions to thereby generate digital signals. The digital signals produced from such processing functions may be provided for further processing (e.g., MPEG decoding, etc.) and display, and/or may be provided to one or more other devices including external device 40 via digital data bus 30.

Processor 14 is also operative to detect and receive command signals provided via user input device 10, and such command signals may control apparatus 20 or external device 40 depending upon the operating mode in which apparatus 20 is set. Processor 14 is operative to detect the current operating mode of apparatus 20 by examining certain data stored in memory 15. According to an exemplary embodiment, processor 14 detects first command signals of a first control protocol from user input device 10 (i.e., generated from user key depressions), and causes input/output means 13 to output second command signals of a second control protocol to external device 40 via digital data bus 30 responsive to the first command signals if apparatus 20 is set to the first mode. The second command signals may be audio video/control (AV/C) protocol signals as defined by the 1394 Trade Association, Grapevine, Tex., USA, or signals of another protocol. Alternatively, processor 14 enables functions of apparatus 20 in a conventional manner responsive to the first command signals (i.e., without enabling output of the second command signals to external device 40) if apparatus 20 is set to the second mode.

According to an exemplary embodiment, processor 14 generates the second command signals using data in memory 15 which "remaps" certain keys of user input device 10, and thereby enables such keys to each control two different functions (i.e., one for external device 40, and one for apparatus 20). That is, a given key of user input device 10 may cause external device 40 to perform a given function when apparatus 20 is set to the first mode, and the same given key may cause apparatus 20 to perform a different function when apparatus 20 is set to the second mode. According to an exemplary embodiment, the following keys of user input device 10 may be remapped to provide the aforementioned dual functionality: the up arrow key, down arrow key, right arrow key, down arrow key, clear key, guide key, menu key and OK key. As previously indicated herein, different manufacturers may use different names for the aforementioned keys. Other keys of user input device 10 may also be remapped according to design choice.

According to an exemplary embodiment, the aforementioned keys of user input device 10 are used to control apparatus 20 in a conventional manner if apparatus 20 is set to the second mode. However, if apparatus 20 is set to the first mode, these keys are remapped by processor 14 to provide command signals to external device 40 in the following manner. Depression of the up arrow key of user input device 10 causes processor 14 to generate a command signal representing a next track command (e.g., AV/C play command with a track number). As is known in the art, a "track" generally refers to a particular recorded segment of data. Depression of the down arrow key of user input device 10 causes processor 14 to generate a command signal representing a previous track command (e.g., AV/C play command with a track number). Depression of the right arrow key of user input device 10 causes processor 14 to generate a command signal representing a skip forward command (e.g., AV/C search command with a relative time). Depression of the left arrow key of user input device 10 causes processor 14 to generate a command signal representing a replay command (e.g., AV/C search command with a relative time). Depression of the clear key of user, input device 10 causes processor 14 to generate a command signal representing a delete command (e.g., AV/C erase command with a track number—may require user confirmation). Depression of the guide key of user input device 10 causes processor 14 to generate a command signal representing a command to show a list of available programs (e.g., AV/C read info block command). Depression of the menu key of user input device 10 causes processor 14 to generate a command signal representing a command to show a list of available setup menus for external device 40 (e.g., AV/C read info block command). Depression of the OK key of user input device 10 causes processor 14 to generate a command signal representing a command to enable a live (non-delayed) broadcast output (e.g., AV/C search command with a relative time). It is noted that some of the aforementioned keys are remapped in a mnemonic manner for easy use and memorization. However, the remapping technique described above is exemplary only, and keys such as the aforementioned keys may be remapped in a different manner according to design choice. Other variations of the aforementioned remapping techniques may also be used. For example, multiple key depressions may activate faster transport speeds (e.g., 2×, 4×, 8×, etc.). Moreover, keys may be remapped to software objects that utilize multiple commands.

Memory 15 is operative to perform data storage functions of apparatus 20. According to an exemplary embodiment, memory 15 stores data such as software code, remapped command data (e.g., correlates first and second command signals), current operating mode data, user setup data and/or other data which enables processor 14 to perform one or more processing and/or control functions.

Figure 3:
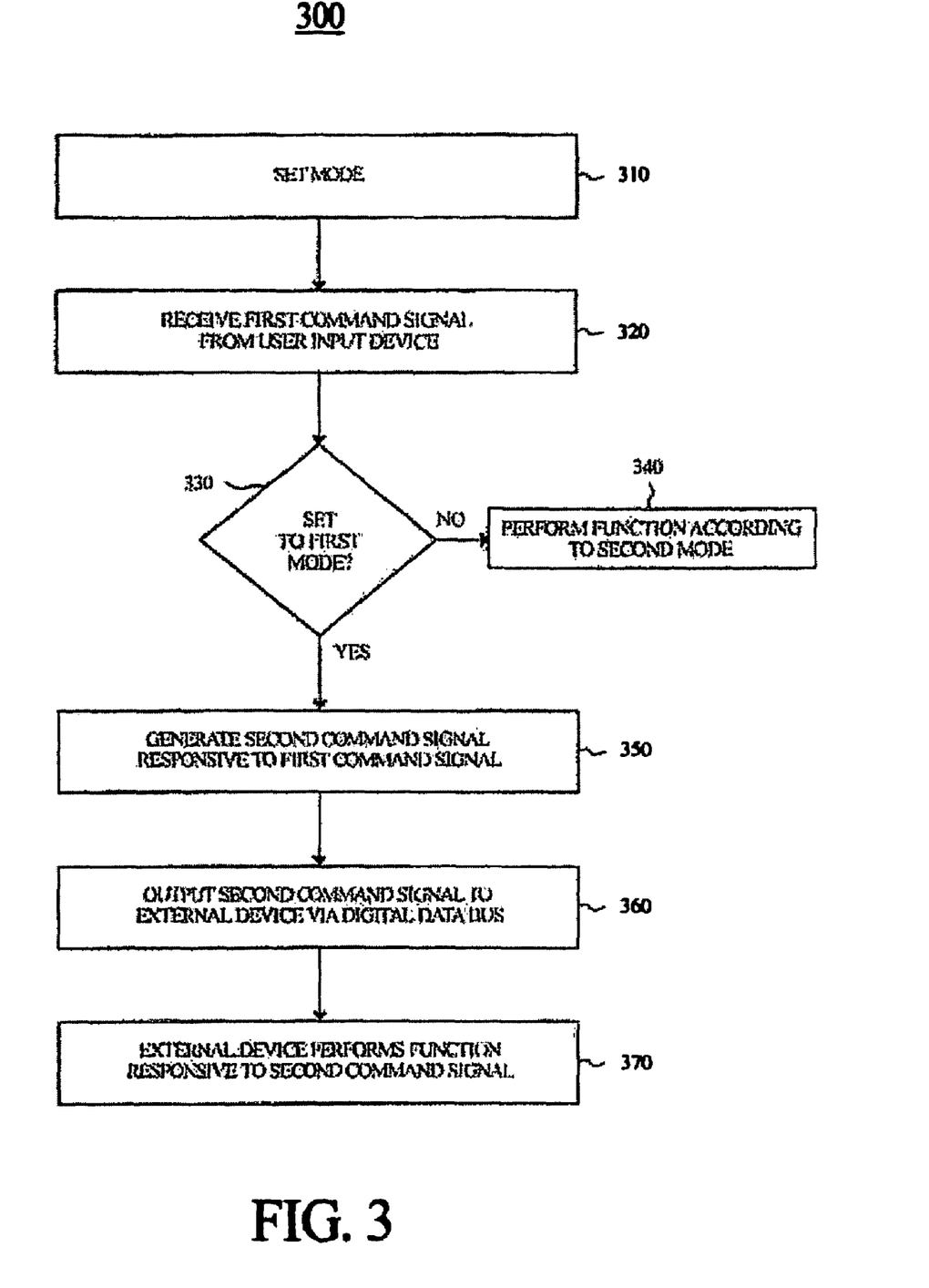
FIG. 3 is a flowchart illustrating steps according to an exemplary embodiment of the present invention.

To facilitate a better understanding of the inventive concepts of the present invention, an example will now be provided. Referring to FIG. 3, a flowchart 300 illustrating steps according to an exemplary embodiment of the present invention is shown. For purposes of example and explanation, the steps of FIG. 3 will be described with reference to the elements shown in environment 100 of FIG. 1. The steps of FIG. 3 are merely exemplary, and are not intended to limit the present invention in any manner.

At step 310, a mode of apparatus 20 is set. As previously indicated herein, apparatus 20 includes a plurality of operating modes wherein a first mode is set in response to making a connection to external device 40 via digital data bus 30 (i.e., connected state), and a second mode is set in response to terminating the connection to external device 40 via digital data bus 30 (i.e., disconnected state). The "connection" referred to at step 310 refers to an operating state in which apparatus 20 can effectively communicate with external device 40 via digital data bus 30. Such a connection (and disconnection) may involve a physical connection, as well as a specific signal exchange between apparatus 20 and external device 40 (e.g., connect request-connect response, disconnect request-disconnect response, etc.). The connection to external device 40 referred to at step 310 may for example include the asynchronous and isochronous connection prescribed by the IEEE-1394 standard. According to an exemplary embodiment, apparatus 20 may be connected to and disconnected from external device 40 responsive to user inputs via user input device 10 which cause apparatus 20 to switch its active input to and away from external device 40, respectively. Data indicating the current operating mode of apparatus 20 is stored in memory 15.

At step 320, apparatus 20 receives a first command signal from user input device 10. According to an exemplary embodiment, the first command signal provided from user input device 10 is of a first control protocol, which may be any wired and/or wireless control protocol, such as one used by a hand-held remote control device, wired and/or wireless keyboard, or other user input device. Also according to an exemplary embodiment, the first command signal may be generated by user input device 10 responsive to user depression of its keys such as the up arrow key, down arrow key, right arrow key, down arrow key, clear key, guide key, menu key, and/or other keys. In particular, the foregoing keys may be used to control either apparatus 20 or external device 40 depending upon the operating mode in which apparatus 20 is set.

At step 330, a determination is made as to whether apparatus 20 is set to the first mode. According to an exemplary embodiment, memory 15 stores data indicating the current operating mode of apparatus 20, and processor 14 makes the determination at step 330 by examining certain data in memory 15. As previously indicated herein, the first mode is set in response to establishing an operative connection between apparatus 20 and external device 40.

If the determination at step 330 is negative, process flow advances to step 340 where apparatus 20 performs a function according to the second mode. As previously indicated herein, command signals from user input device 10 control apparatus 20 in a conventional manner during the second mode. Alternatively, if the determination at step 330 is positive, process flow advances to step 350 where apparatus 20 generates a second command signal responsive to the first command signal received at step 320. As previously indicated herein, the second command signal generated by processor 14 is of a second control protocol such as AV/C or other protocol. Moreover, processor 14 generates the second command signal in accordance with a predetermined scheme, which remaps certain keys of user input device 10. Table 1 below shows an exemplary manner in which the keys of user input device 10 may be remapped.

TABLE 1

| Key For Generating First Command Signal | Command Represented by Second Command Signal |
|---|---|
| Up Arrow Key | Next Track Command |
| Down Arrow Key | Previous Track Command |
| Right Arrow Key | Skip Forward Command |
| Left Arrow Key | Replay Command |
| Clear Key | Delete Command |
| Guide Key | Show Programs Command |
| Menu Key | Show Setup Menus Command |
| OK Key | Live Broadcast Command |

At step 360, apparatus 20 outputs the second command signal generated at step 350 to external device 40 via digital data bus 30. Then, at step 370, external device 40 performs a function responsive to the second command signal. The function performed at step 370 may for example correspond to one of the commands shown in Table 1 above.

As described herein, the present invention provides a method and apparatus for controlling a device via a digital data bus by remapping keys on a user input device. The present invention may be applicable to various apparatuses, either with or without a display device. Accordingly, the phrase "television signal receiver" as used herein may refer to systems or apparatuses including, but not limited to, television sets, computers or monitors that include a display device, and systems or apparatuses such as set-top boxes, VCRs, DVD players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for a first device controlling an external device, comprising:
    setting in the first device one of first and second modes, wherein said first mode is set in response to making a connection to said external device via a data bus and said second mode is set in response to terminating said connection to said external device via said data bus;
    receiving a first command signal of a first control protocol from a user input device;
    generating a second command signal of a second control protocol responsive to said first command signal and outputting said second command signal to said external device via said data bus if said first mode is set;
    performing a function responsive to said first command signal without generating and outputting said second command signal if said second mode is set; and wherein:
    said user input device includes an up arrow key;
    said first command signal is generated by said user input device responsive to user depression of said up arrow key; and
    said second command signal represents a next track command.

2. The method of claim 1, wherein said data bus includes an IEEE-1394 bus.

3. The method of claim 1, wherein said second control protocol includes an audio/video control (AV/C) protocol.

4. An apparatus, comprising:
    input/output means for enabling signal transfer between said apparatus and an external device via a data bus;
    processing means for detecting a first command signal of a first control protocol from a user input device, and for detecting one of first and second modes of said apparatus;
    wherein said processing means detects said first mode in response to making a connection between said apparatus and said external device via said data bus, and detects said second mode in response to terminating said connection between said apparatus and said external device via said data bus;
    wherein said processing means enables said input/output means to output a second command signal of a second control protocol to said external device via said data bus responsive to said first command signal if said first mode is detected; and
    wherein said processing means enables a function of said apparatus responsive to said first command signal without enabling output of said second command signal to said external device if said second mode is detected.

5. The apparatus of claim 4, wherein said data bus includes an IEEE-1394 bus.

6. The apparatus of claim 4, wherein said second control protocol includes an audio/video control (AV/C) protocol.

7. The apparatus of claim 4, wherein:
said user input device includes an up arrow key;
said first command signal is generated by said user input device responsive to user depression of said up arrow key; and
said second command signal represents a next track command.

8. The apparatus of claim 4, wherein:
said user input device includes a down arrow key;
said first command signal is generated by said user input device responsive to user depression of said down arrow key; and
said second command signal represents a previous track command.

9. The apparatus of claim 4, wherein:
said user input device includes a right arrow key;
said first command signal is generated by said user input device responsive to user depression of said right arrow key; and
said second command signal represents a skip forward command.

10. The apparatus of claim 4, wherein:
said user input device includes an a left arrow key;
said first command signal is generated by said user input device responsive to user depression of said left arrow key; and
said second command signal represents a replay command.

11. The apparatus of claim 4, wherein:
said user input device includes a clear key;
said first command signal is generated by said user input device responsive to user depression of said clear key; and
said second command signal represents a delete command.

12. A television signal receiver, comprising:
an input/output terminal operative to enable signal transfer between said television signal receiver and an external device via a data bus;
a processor operative to detect a first command signal of a first control protocol from a user input device, and for detecting one of first and second modes of said television signal receiver;
wherein said processor detects said first mode in response to making a connection between said television signal receiver and said external device via said data bus, and detects said second mode in response to terminating said connection between said television signal receiver and said external device via said data bus;
wherein said processor enables said input/output terminal to output a second command signal of a second control protocol to said external device via said data bus responsive to said first command signal if said first mode is detected; and
wherein said processor enables a function of said television signal receiver responsive to said first command signal without enabling output of said second command signal to said external device if said second mode is detected.

13. The television signal receiver of claim 12, wherein said data bus includes an IEEE-1394 bus.

14. The television signal receiver of claim 12, wherein said second control protocol includes an audio/video control (AV/C) protocol.

15. The television signal receiver of claim 12, wherein:
said user input device includes an up arrow key;
said first command signal is generated by said user input device responsive to user depression of said up arrow key; and
said second command signal represents a next track command.

16. The television signal receiver of claim 12, wherein:
said user input device includes a down arrow key;
said first command signal is generated by said user input device responsive to user depression of said down arrow key; and
said second command signal represents a previous track command.

17. The television signal receiver of claim 12, wherein:
said user input device includes a right arrow key;
said first command signal is generated by said user input device responsive to user depression of said right arrow key; and
said second command signal represents a skip forward command.

18. The television signal receiver of claim 12, wherein:
said user input device includes an a left arrow key;
said first command signal is generated by said user input device responsive to user depression of said left arrow key; and
said second command signal represents a replay command.

19. The television signal receiver of claim 12, wherein:
said user input device includes a clear key;
said first command signal is generated by said user input device responsive to user depression of said clear key; and
said second command signal represents a delete command.

20. A method for a first device controlling an external device, comprising:
setting in the first device one of first and second modes, wherein said first mode is set in response to making a connection to said external device via a data bus and said second mode is set in response to terminating said connection to said external device via said data bus;
receiving a first command signal of a first control protocol from a user input device;
generating a second command signal of a second control protocol responsive to said first command signal and outputting said second command signal to said external device via said data bus if said first mode is set;
performing a function responsive to said first command signal without generating and outputting said second command signal if said second mode is set; and wherein:
said user input device includes a down arrow key;
said first command signal is generated by said user input device responsive to user depression of said down arrow key; and
said second command signal represents a previous track command.

21. The method of claim 20, wherein said data bus includes an IEEE-1394 bus.

22. The method of claim 20, wherein said second control protocol includes an audio/video control (AV/C) protocol.

23. A method for a first device controlling an external device, comprising;
setting in the first device one of first and second modes, wherein said first mode is set in response to making a connection to said external device via a data bus and said second mode is set in response to terminating said connection to said external device via said data bus;

receiving a first command signal of a first control protocol from a user input device;

generating a second command signal of a second control protocol responsive to said first command signal and outputting said second command signal to said external device via said data bus if said first mode is set;

performing a function responsive to said first command signal without generating and outputting said second command signal if said second mode is set; and wherein:

said user input device includes a right arrow key;

said first command signal is generated by said user input device responsive to user depression of said right arrow key; and said second command signal represents a skip forward command.

24. The method of claim 23, wherein said data bus includes an IEEE-1394 bus.

25. The method of claim 23, wherein said second control protocol includes an audio/video control (AV/C) protocol.

26. A method for a first device controlling an external device, comprising:

setting in the first device one of first and second modes, wherein said first mode is set in response to making a connection to said external device via a data bus and said second mode is set in response to terminating said connection to said external device via said data bus;

receiving a first command signal of a first control protocol from a user input device;

generating a second command signal of a second control protocol responsive to said first command signal and outputting said second command signal to said external device via said date bus if said first mode is set;

performing a function responsive to said first command signal without generating and outputting said second command signal if said second mode is set; and wherein:

said user input device includes a left arrow key;

said first command signal is generated by said user input device responsive to user depression of said left arrow key; and said second command signal represents a replay command.

27. The method of claim 26, wherein said data bus includes an IEEE-1394 bus.

28. The method of claim 26, wherein said second control protocol includes an audio/video control (AV/C) protocol.

29. A method for a first device controlling an external device, comprising:

setting in the first device one of first and second modes, wherein said first mode is set in response to making a connection to said external device via a data bus and said second mode is set in response to terminating said connection to said external device via said data bus;

receiving a first command signal of a first control protocol from a user input device;

generating a second command signal of a second control protocol responsive to said first command signal and outputting said second command signal to said external device via said data bus if said first mode is set;

performing a function responsive to said first command signal without generating and outputting said second command signal if said second mode is set; and wherein:

said user input device includes a clear key;

said first command signal is generated by said user input device responsive to user depression of said clear key; and said second command signal represents a delete command.

30. The method of claim 29, wherein said data bus includes an IEEE-1394 bus.

31. The method of claim 29, wherein said second control protocol includes an audio/video control (AV/C) protocol.

* * * * *